3,305,533
POLYURETHANE POLYMERS HAVING URE-
THANE AND SEMI-CARBAZIDE GROUPINGS
Wilhelm Thoma, Cologne-Flittard, and Heinrich Rinke and Harald Oertel, Leverkusen, Germany, assignors to Farbenfabriken Bayer Aktiengesellschaft, Leverkusen, Germany, a German corporation
No Drawing. Filed Dec. 21, 1962, Ser. No. 246,327
Claims priority, application Germany, Dec. 30, 1961, F 35,698
10 Claims. (Cl. 260—75)

This invention relates to polyurethane polymers and to a method of preparing the same. More particularly, it relates to polyurethane polymers suitable for fabrication into coatings, fibers and films.

It has been heretofore known to produce polyurethane polymers by the polyaddition process wherein the final product, whether it is a fiber, film or coating, is fabricated from a solution. Two different methods have been used primarily. These are generally either two component systems or one component systems.

In the two component system, mixtures or solutions of polyisocyanates with polyesters having hydroxy groups or polyester urethanes having hydroxyl groups are applied to the support material shortly after mixing. The coating thus formed is cured on the material. It has also been known in this process to utilize isocyanate modified polyesters containing hydrazide groups.

The two component process suffers the serious disadvantage of short storage capacity or pot-life once the isocyanate is mixed with the active hydrogen containing compound. Another disadvantage is that the system of the substrate and the reaction mixture applied thereto must be cured at high temperatures in order to achieve a speed necessary for series or mass production.

In the one component process a polymer, which does not contain either free isocyanate groups or free isocyanate, is prepared in solution by the isocyanate polyaddition process and is applied to the support to achieve coatings. Such polyaddition products in solution are obtained, for example, by reacting a polyhydroxy compound with an excess of a polyisocyanate and the reaction product having isocyanate groups are reacted in a solvent, inert with regard to the NCO groups, with a quantity of a polyhydraulic alcohol less than that required to completely react with all the NCO groups present in the solvent solution. This reaction occurs in the presence of suitable catalysts which cause the polymerization of the NCO groups. The reaction is conducted for a sufficient time to permit the solution to reach the required viscosity and until NCO groups are no longer present. These coatings provide a soft textile "handle" but exhibit low resistance to rubbing or abrasion when filled with suitable pigments.

A second one component process consists of reacting in solution an NCO terminated active hydrogen compound with polyhydrazides such as, for example, carbohydrazide. Pigmented coatings prepared by this technique exhibit a small degree of abrasion, however, they are stiff in the textile sense, because of the high modulus of the elastomer. Furthermore, such polymers do not permit the required high filler of 50 to 100.

It is therefore an object of this invention to provide polyurethane polymers suitable for fabrication into coatings, films and fibers. It is another object of this invention to provide a one component process for forming fibers, films and coatings. It is another object of this invention to provide polyurethane coatings, fibers and films having a soft feel together with a high abrasion resistance. It is a further object of this invention to provide a one-component process for the preparation of highly filled coatings which have a high abrasion resistance accompanied with a soft feel.

The foregoing objects and others which will become apparent from the following description are accomplished in accordance with the invention generally speaking by providing polyurethane polymers suitable for fabrication into coatings, fibers and films by reacting a substantially linear NCO terminated polyurethane prepopolymer with from about 10 to 90 equivalent percent, based on the NCO groups, of a polyhydric alcohol to form a polyurethane intermediate having NCO groups and reacting the intermediate in a second step with from about 90 to about 110 equivalent percent based on the remaining NCO content of the intermediate with a hydrazide having the formula R—NH—NR—A—(XA)$_n$—NR—NHR
RNH—Z—A—NR—NHR
HO—Z—A—NR—NHR wherein A is a CO, CS or SO$_2$ group; R is a hydrogen atom, alkyl or aryl group; X is an alkylene, arylene, aralkylene radical or an OYO— or NH—Y—NH— group; Z is an alkylene, arylene, aralkylene radical or a YO or YNH group where Y in both instances is a divalent organic radical and N is either 0 or 1. Thus, the invention contemplates the preparation of a polymer containing both urethane groups and semi-carbazide groups by a two step reaction wherein an NCO terminated prepolymer is first reacted with a deficiency of a polyhydric alcohol and secondly, with a compound containing hydrazide group.

The reaction can be conducted either in the melt or in solution or it can be conducted partially in the melt and partially in solution, that is, the first step can be conducted in the melt and a second step in a suitable solvent for the reactants and for the product or the entire reaction can be conducted in the melt and the product formed thereby dissolved in a suitable solvent therefor. While it is not necessary that any solvent be used, it is preferred that the final article whether it be a coating, fiber or film be formed from solution because such solutions facilitate the formation of the final object.

The process according to the invention is characterized by the fact that the polymers prepared in accordance therewith and usually in the form of solutions, which polymers are intended for coating and impregnation purposes, for the preparation of films, coatings and the like are capable of being stored. Coatings, films and coverings prepared therefrom are distinguished by a particularly high resistance to abrasion and with a simultaneously soft handle, even with a high pigment loading.

The NCO terminated prepolymers used in reaction with the polyhydric alcohols are prepared by customary techniques by reacting organic compounds containing active hydrogen atoms which are reactive with —NCO groups with an excess of an organic diisocyanate to prepare a substantially linear NCO terminated prepolymer. The active hydrogen containing compound should have a molecular weight of from about 500 to about 5000.

Any suitable organic compound containing active hydrogen atoms which are reactive with —NCO groups and which are determined by the Zerewitinoff test may be reacted with an organic polyisocyanate to produce an isocyanate-modified compound for use in the process of this invention such as, for example, hydroxyl polyesters, polyester amides, polyhydric polyalkylene ethers, polyhydric polythioethers, polycarbonates, polyacetals and the like.

Any suitable hydroxyl polyester may be used for the preparation of the isocyanate modified active hydrogen compound, such as those prepared from dihydric alcohols and dicarboxylic acids. Any suitable dicarboxylic acid may be used such as, adipic acid, methyl adipic acid, glutaric acid, succinic acid, azelaic acid, sebacic acid, nonane-dicarboxylic acid, thiodipropionic acid, pimelic acid, ricinoelic acid, suberic acid, fumaric acid, maleic acid, phthalic acid, terephthalic acid, isophthalic acid, hexahydroterephthalic acid and the like. Any suitable dihydric alcohol may be used such as, for example, ethylene glycol, 1,3-propylene diol, dimethyl propane-1,3-diol, 1,4-butanediol, 1,6-hexanediol, 2,5-hexanediol, methylhexanediol, 1,10-decanediol, thiodiglycol, diethylene glycol, triethylene glycol, 4,4′-dihydroxy dicyclohexyl dimethyl methane, N-methyl diethanolamine, bis-oxymethyl cyclohexane, phenylene-1,4-bis-hydroxyethyl ether, trimethylol propane and the like. Further suitable polyesters can be obtained from caprolactones and glycols such as 1,4-butanediol. Since the polyester must be substantially linear, trifunctional alcohols can be employed in its preparation to a minor extent only, that is up to at most 5 mol percent based on the amount of alcoholic starting materials.

Any suitable polyester amide may be used such as those prepared by the incorporation of amino alcohols, amino carboxylic acids and polyamines into the formulations for hydroxyl polyesters set forth above. Any suitable amino alcohols such as, for example, ethanol amine, propanol amine and the like may be used. Any suitable polyamine such as, for example, toluylene diamine, hexanediamine, piperazine, and the like may be used. Any suitable amino carboxylic acid such as, for example ω-amino caproic acid and ω-amino undecanoic acid and the like may be used. Specific polyester amides include for example, adipic acid, diethanolamide acid, terephthalic acid, bis-N-methylpropanol amide and the like.

Any suitable polyalkylene ether may be used in the preparation of isocyanate modified active hydrogen containing compounds in accordance with this invention such as the reaction product of any of the above-mentioned polyhydric alcohols with alkylene oxides such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. The polyhydric polyalkylene ethers may be prepared by any known process such as, for example, the process disclosed by Wurtz in 1859 and in "Encyclopedia of Chemical Technology," Vol. 7, pp. 257–262, published by Interscience Publishers, Inc. (1951) or in U.S. Patent 1,922,459.

Any suitable polyhydric polythioether may be used such as for example, the condensation product of a thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable polyacetal may be used such as, for example, the reaction product prepared by reacting an aldehyde with a polyhydric alcohol. Any of the polyhydric alcohols mentioned above may be used. Any suitable aldehyde may be used such as, for example, formaldehyde, polymers of formaldehyde, acetaldehyde, butyraldehyde and the like. The polyacetals may further be prepared by reacting long chain polyhydric alcohols such as polyesters and polyalkylene ethers such as those mentioned above with aldehydes. Such long chain alcohols may have a molecular weight of from about 200 to about 2000. The polyacetals described in German patent specification Nos. 1,039,744 and 1,045,095 are suitable for use in the preparation of the isocyanate-modified polyhydroxy compound in accordance with this invention. Any of these compounds containing active hydrogen containing groups when reacted with an excess of an organic containing polyisocyanate are suitable in the practice of this invention to prepare isocyanate modified polyhydroxy compounds.

Any suitable hydroxyl-terminated polycarbonate such as, for example, those set forth in Canadian Patents 578,-585, 578,795 and 594,805 may be used. Further, the polycarbonates obtained from cyclic carbonates and glycols and those hydrocarbon polymers which contain small quantities of hydroxyl groups can likewise be used as starting materials.

In addition to the above mentioned active hydrogen compounds for the preparation of prepolymers hydroxyl terminated adducts of any of these compounds with a deficiency of an organic polyisocyanate may be used to prepare the NCO terminated prepolymers suitable for use in accordance with this invention. Such active hydrogen containing compounds have urethane linkages incorporated therein.

The NCO terminated prepolymers used in reaction with the polyhydric alcohols in the first reaction step in accordance with this invention are prepared by reacting any of the above mentioned active hydrogen containing compounds with an excess of an organic diisocyanate. It is preferred to use 1.50–4 mols and preferably about 2 mols of diisocyanate per mol of polyhydroxy compound. In this case, with a molar ratio of polyhydroxy compound to diisocyanate of about 1:2, compounds are formed wherein there is still a certain linking of the individual molecules of the polyhydroxy compound, but free —NCO groups occur at the ends.

With a molar ratio of exactly 1:2, merely the ends of the chains of the polyhydroxy compounds are provided by way of urethane groups with free —NCO groups, whereas the molar ratios greater than 1:2, free diisocyanate is present in addition to those compounds of high molecular weight which carry isocyanate groups. This reaction can be effected in known manner by dehydrating the polyhydroxy compound by heating it for approximately one hour in vacuo at 130° C. and reacting the dehydrated polyhydroxy compound with the diisocyanate at an elevated temperature of for example, from 80° C. to 130° C. Alternatively, a solution of the diisocyanate in an inert solvent such as methylene chloride, acetone or benzene may be added to the polyhydroxy compound. The temperature of the mixture is slowly raised while distilling off the solvent and the reaction is allowed to proceed for a sufficient time (about 1–2 hours) at an elevated temperature (preferably 90° C. to 110° C.).

The reaction may be also effected in the presence of a small quantity of a trifunctional alcohol (less than 5% of the OH number of the polyhydroxy compound), such as trimethylol ethane or trimethylol propane or trifunctional isocyanates, in which case the reaction should lead only to such weakly branched products that a gel formation does not occur.

Any suitable organic diisocyanate may be used in the process of this invention to produce isocyanate-modified polyhydroxyl compounds such as, for example, 1,4-phenylene diisocyanate, 4,4′-diphenyl diisocyanate, 4,4′-diphenyl methane diisocyanate, 4,4′-diphenyl dimethyl methane diisocyanate, dibenzyl diisocyanate, 2,4-toluylene diisocyanate, 2,6-toluylene diisocyanate and mixtures of 2,4- and 2,6 - toluylene diisocyanate, 1,4 - cyclohexane diisocyanate, hexamethylene diisocyanate, 4,4′-hexahydrodiphenyl methane diisocyanate, naphthalene-1,5-diisocyanate, furfurylidene diisocyanate, 1,5-tetraline diisocyanate, di-(3-isocyanato-4-methyl phenyl)-urea, 3,3′-dimethyl-4,4′-diphenylmethanediisocyanate, 3,3′ - dimethoxy- or 3,3′-dichloro- 4,4′-diphenylmethane-diisocyanate, 2,2′-diethyl-4,4′-diphenylmethane-diisocyanate, 3,3′ - dimethyl - 4,4′ - diphenyldiisocyanate, 1 - methyl - 3,5- diethyl - 2,4 - phenyldiisocyanate, diphenylether-4,4'-diisocyanate, stilbene diisocyanate, 4,4'-diphenylsulfide diisocyanate, xyxylene diisocyanate, dicyclohexylmethane diisocyanate, 4,4',4''-triisocyanatophenyl thiophosphate and the like. The symmetrical diisocyanates are preferred. The products prepared from 4,4'-diphenyl dimethyl-methane diisocyanate and hexamethylene diisocyanate have excellent stability to light. Since the NCO-terminated polyurethane prepolymer should be substantially linear, trifunctional isocyanates can be employed to a minor extent only, that is up to 5 mol percent of isocyanate. The said reaction of the said components to form the NCO-terminated prepolymer is preferably effected by providing 125–250 parts by weight of NCO-groups in the polyester to 34 parts by weight of hydroxyl groups in the polyhydroxyl compound and working between 80 and 150° C., preferably between 80 and 130° C., in the melt or with the use of solvents which are neutral with respect to NCO-groups.

As stated previously, the process can be conducted either in the melt or in a suitable solvent, the reaction of the NCO terminated prepolymer with the polyhydric alcohols is preferably conducted in a solvent which is neutral with respect to the NCO groups such as, for example, butyl acetate, acetic ester dipropyl ether, dioxane, tetrahydrofuran, chlorobenzene, glycol methyl ether acetate, ethyl acetate, acetone, cyclohexanone, methylene chloride, chloroform and the like. These inert neutral solvents are suitable for carrying out the first reaction stage of the prepolymer with the polyhydric alcohol. However, it is preferred that such solvents be used in small amounts because they are poor solvents for the final reaction product and therefore, should be used only in minor amounts in the second stage reaction.

The isocyanate terminated prepolymer is reacted with from about 10 to about 90 equivalent percent based on the —NCO groups in the prepolymer of a polyhydric alcohol to provide a polyurethane intermediate having isocyanate groups. This reaction is conducted preferably at temperatures between about 50 to about 150° C. and for best results, at a temperature at from about 70 to about 110° C.

Any suitable polyhydric alcohol may be used in reaction with the isocyanate terminated prepolymer to prepare the polyurethane intermediate such as, for example, any of those previously mentioned for the preparation of the polyesters and also diglycol, xyxylene glycol, short chain polyesters having hydroxyl groups, piperazine-dicarboxylic acid bis-hydroxy ethyl esters and the like. The polyhydric alcohols should have a molecular weight of less than about 500, minor amounts of higher functional alcohols such as, for example, trimethylol propane, glycerine and the like can be concurrently used.

In the second stage of the reaction, that is the reaction of the polyurethane intermediate with the hydrazine compound, it is preferred to use strongly polar solvents which are known to dissolve polyacrylonitrile. These highly polar solvents exhibit a strong tendency to form hydrogen bonds. Any suitable solvent of this nature may be used such as, for example, dimethyl formamide, dimethyl acetamide, dimethyl propionamide, tetramethylene sulfone, N-methyl pyrollidone, dimethyl sulphoxide, hexamethyl phosphorous amide and the like. These solvents may be blended with other solvents such as dioxane, tetrahydrofuran, glycol methylether acetate, ethyl acetate, acetone, chlorobenzene, cyclohexanone, methylene chloride and chloroform, which under the reaction conditions have to be inert to —NCO groups. Of course, as stated previously, this reaction may also be conducted in the melt and the material thus formed used directly or after dissolution in a suitable solvent to form the desired final object whether it be a film, fiber or coating. It is preferred, however, to conduct the second stage reaction in a suitable polar solvent such as it is immediately mentioned above.

The reaction of the polyurethane intermediate and the hydrazide compound is generally carried out at a temperature from about 0 to about 50° C. and more preferably from about 10 to about 20° C. The hydrazide compound is used in an amount of from about 90 to about 110 equivalent percent based upon the NCO content of the polyurethane intermediate. It is especially preferred to use about 100 equivalent percent of the hydrazide compound. By using an excess of the hydrazide compound it is possible to avoid an undesirable swelling of the reaction product. On the other hand, if a deficiency of the hydrazide compound is used, it is preferred to combine the unreacted NCO groups with monoamines, monoalcohols or monohydrazides such as, isobutyl-amine, propyl-amine, phenyl-amine, ethyl alcohol, butyl alcohol, propyl alcohol, hydrazo monocarboxylic acid ethyl ester, and the like. These monofunctional compounds act as chain-breaking agents. Any excess of the chain-breaking agents present can be reacted in conventional manner by the addition of pyrocarbonic acid, diethyl ester to form inert products.

The hydrazide containing compounds are represented by the formulas set forth above wherein A represents a CO, CS or a $SO_2$ group; R is either hydrogen, alkyl or aryl and need not be the same in each instance, such as, for example, methyl, ethyl, n-propyl, isopropyl, n-butyl, isobutyl, sec-butyl, t-butyl, n-amyl and various positional isomers thereof, such as, for example, 1-methyl-butyl, 2-methyl-butyl, 3-methyl-butyl, 1,1-dimethyl-propyl, 1,2-dimethyl-propyl, 2,2-dimethylpropyl, 1-ethylpropyl and the like; corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like; phenyl, $\alpha$-naphthyl, $\beta$-naphthyl, $\alpha$-anthryl, $\beta$-anthryl, gamma-anthryl, including the various monovalent radicals of indene, isodene, acenaphthene, fluorine, phenanthrene, naphthacene, chrysene, pyrene, triphenylene and the like. However, R is preferably hydrogen, methyl or phenyl. X and Z can be any alkylene, arylene or aralkylene radical such as, for example, methylene, ethylene, n-propylene, isopropylene, n-butylene, isobutylene, sec-butylene, t-butylene, n-amylene; and various positional isomers thereof such as, for example, 1-methyl-butylene, 2-methyl-butylene, 3-methyl-butylene, 1,1-dimethyl-propylene, 1,2-dimethyl-propylene, 2,2-dimethylpropylene, 1-ethylpropylene and the like; corresponding straight and branched chain isomers of hexylene, heptylene, octylene, nonylene, decylene, undecylene, dodecylene, tridecylene, tetradecylene, pentadecylene, hexadecylene, heptadecylene, octadecylene, nondecylene, eicosylene and the like; phenylene, naphthylene, anthrylene, phenylmethylene, $\alpha$-phenyl-ethylene, $\beta$ - phenyl - ethylene, $\alpha$ - phenyl - propylene, $\beta$ - phenyl-propylene, gamma - phenyl - propylene, $\alpha$ - phenylisopropylene, $\beta$ - phenyl - isopropylene, $\alpha$-phenyl-butylene, $\beta$-phenyl-butylene, gamma-phenyl-butylene, delta-phenyl-butylene, $\alpha$-phenyl-isobutylene, $\beta$-phenyl-isobutylene, gamma-phenyl-isobutylene, $\alpha$-phenyl-sec-butylene, $\beta$-phenyl-sec-butylene, gamma-phenyl-sec-butylene, $\beta$-phenyl-t-butylene, $\alpha'$-naphthyl-methylene, $\beta'$-naphthyl-methylene, $\alpha$-($\alpha'$-naphthyl)-ethylene, $\alpha$-($\beta'$-naphthyl)-ethylene, $\beta$-($\alpha'$-naphthyl)-ethylene, $\beta$-($\beta'$-naphthyl)-ethylene, $\alpha$-($\alpha'$-naphthyl)-propylene, $\alpha$-($\beta'$-naphthyl)-propylene, $\beta$-($\alpha'$-naphthyl)-propylene, $\beta$-($\beta'$-naphthyl)-propylene, gamma-($\alpha'$-naphthyl)-propylene, gamma-$\beta'$-naphthyl)-propylene, $\alpha$-($\alpha'$-naphthyl)-isopropylene, $\alpha$-($\beta'$-naphthyl)-isopropylene, $\alpha$-($\alpha'$-naphthyl)-butylene, $\alpha$-($\beta'$-naphthyl)-butylene, $\beta$-($\alpha'$-naphthyl)-butylene, $\beta$-($\beta'$-naphthyl)-butylene, gamma-($\alpha'$-naphthyl)-butylene, gamma-($\beta'$-naphthyl)-butylene, delta-($\alpha'$-naphthyl)-butylene, $\alpha$-($\alpha'$-naphthyl)-isobutylene, $\alpha$-($\beta'$-naphthyl)-isobutylene, $\beta$-($\alpha'$-naphthyl)-isobutylene, $\beta$-($\beta'$ - naphthyl) - isobutylene, gamma - ($\alpha'$ - naphthyl)-isobutylene, gamma-($\beta'$-naphthyl)-isobutylene, $\alpha$-($\alpha'$-naphthyl)-sec-butylene, $\alpha$-($\beta'$-naphthyl)-sec-butylene, $\beta$-($\alpha'$-naphthyl)-sec-butylene, $\beta$-($\beta'$-naphthyl)-sec-butylene, gamma-(α'-naphthyl)-sec-butylene, gamma - (β' - naphthyl)-sec-butylene, β-(α-naphthyl)-t-butylene, β-(β'-naphthyl)-t-butylene, the corresponding α'- and β'-naphthyl derivatives of n-amyl and the various positional isomers thereof such as, for example, 1-methyl-butylene, 2-methyl-butylene, 3-methyl-butylene, 1,1-dimethyl-propylene, 1,2-dimethyl-propylene, 2,2-dimethyl-propylene, 1-ethyl-propylene and said derivatives of the corresponding isomers of hexylene, heptylene, octylene and the like, including eicosyl and the α'-, β'-, gamma'-anthryl derivatives of alkyl radicals α'-anthryl-methylene, α-(β'-anthryl)-ethylene, β-(gamma'-anthryl)-ethylene, α-(β'-anthyl)-butylene, delta-(β'-anthryl)-2-methyl-amylene; corresponding alkylene derivatives of phenanthrene, fluorene, acenaphthene, chrysene, pyrene, triphenylene, naphthacene and the like. X can also be OYO or NH—Y—NH and Z can also be YO or Y—NH wherein Y is any suitable divalent organic radical such as, for example, those mentioned above with regard to the definition of X and Z and also ethenylene, 1-propenylene, 2-propenylene, isopropenylene, 1-butenylene, 2-butenylene, 3-butenylene, corresponding branched chain isomers such as, for example, 1-isobutenylene, 2-isobutenylene, 1-sec-butenylene, 2-sec-butenylene, 1-methylene-2-propenylene, 1-pentenylene, 2-pentenylene, 3-pentenylene, 4 - pentenylene, 1 - hexenylene, 2 - hexenylene, 3 - hexenylene, 4 - hexenylene, 5 - hexenylene, corresponding branched chain isomers such as, 3,3-dimethyl-1-butenylene, 2,3-dimethyl-1-butenylene, 2,3-dimethyl-2-butenylene, 2,3-dimethyl-3-butenylene, 1-methyl-1-ethyl-2-propenylene; and the various isomers of heptenylene, octenylene, nonenylene, decenylene, undecenylene, dodecenylene, tridecenylene, tetradecenylene, pentadecenylene, hexadecenylene, heptadecenylene, octadecenylene, nondecenylene, eicosenylene and the like; o-tolylene, m-tolylene, p-tolylene, 2,3-xylylene, 2,4-xylylene, 2,5-xylylene, 2,6-xylylene, 3,4-xylylene, 3,5-xylylene, o-cumenylene, m-cumenylene, p-cumenylene, mesitylene, o-ethylphenylene, m-ethylphenylene, p-ethylphenylene, 2-methyl-α-naphthylene, 3-methyl-α-naphthylene, 4-methyl-α-naphthylene, 5-methyl-α-naphthylene, 6-methyl-α-naphthylene, 7-methyl-α-naphthylene, 8-methyl-α-naphthylene, 1-ethyl-β-naphthylene, 3-ethyl-β-naphthylene, 4-ethyl-β-naphthylene, 5-ethyl-β-naphthylene, 6-ethyl-β-naphthylene, 7-ethyl-β-naphthylene, 8-ethyl-β-naphthylene, 2,3-dipropyl-α-naphthylene, 5,8-diisopropyl-β-naphthylene and the like; α-phenyl-ethylene, β-phenyl-ethenylene, α-phenyl-1-propenylene, β-phenyl-1-propenylene, gamma-phenyl-1-propenylene, α-phenyl-2-propenylene, β-phenyl-2-propenylene, gamma-phenyl-2-propenylene, β-phenyl-isopropenylene; phenyl derivatives of the isomers of butenylene, pentenylene, hexenylene, heptenylene up to and including eicosenylene, also α-(α'-naphthyl)-ethenylene, α-(β'-naphthyl)-ethenylene, β-(α'-naphthyl)-ethenylene, β-(β'-naphthyl)-ethenylene, α-(α'-naphthyl)-1-propenylene, α-(β'-naphthyl)-1-propenylene, β-(α'-naphthyl)-1-propenylene, β-(β'-naphthyl)-1-propenylene, α-(α'-naphthyl-2-propenylene, α-(β'-naphthyl)-2-propenylene, β-(α'-naphthyl)-2-propenylene, β-(β'-naphthyl)-2-propenylene, α-(α'-naphthyl)-isopropenylene, α-(β'-naphthyl)-isopropenylene, β-(α'-naphthyl)-isopropenylene, β,-(β'-naphthyl)-isopropenylene; aromatic derivatives of alkylenes such as, phenanthrene, fluorene, acenaphthene, chrysene, pyrene, triphenylene, naphthacene and the like; cyclopropylene, cyclobutylene, cycloamylene, cyclohexylene, cycloheptylene, cyclooctylene, cyclononylene, cyclodecylene, cycloundecylene, cyclododecylene, cyclotridecylene, cyclotetradecylene, cyclopentadecylene, cyclohexadecylene, cycloheptadecylene, cyclooctodecylene, cyclonondecylene, cycloeicosylene; cycloaliphatic radicals such as, cyclopropyl-ethylene, β-cyclopropyl-ethylene, α-cyclobutylpropylene, β-cyclobutyl-propylene, gamma-cyclobutyl-propylene, α-cycloamyl-isopropylene, β-cycloamyl-isopropylene and the like. In the formula, n is either 0 or 1. Specific examples of compounds as represented by these formulas include such as, for example, carbodihydrazide, N,N'-dimethyl carbodihydrazide, 1,5-diphenyl carbodihydrazide, thiocarbodihydrazide, sulphodihydrazide, oxalic acid, oxethyl hydrazide, dicarboxylic acid dihydrazides such as the dihydrazides of oxalic acid, malonic acid, succinic acid, adipic acid, isophthalic acid, piperazinedicarboxylic acid, iminodicarboxylic acid; disulphonic acids, such as, for example, 1,3 or 1,4-phenylene disulphonic acid; cyclobutane 1,2-dicarboxylic acid, cyclohexane 1,3- and cyclohexane 1,4-dicarboxylic acid and the like; ethylene and butylene-bis-carbaninic acid esters, hexane-, butane-, xylylene-1,3-bis-semicarbazides, ethylene-bis-semicarbazide, tetramethylene-bis-semicarbazide, 1,4-phenylene-bis-semicarbazide.

ω-aminocaproic acid hydrazide, ω-aminobutyric acid hydrazide, ω-hydroxy caproic acid hydrazide, ω-hydroxy butyric acid hydrazide, tartaric acid dihydrazide ω-hydroxy butyric acid-β-hydroxy ethyl hydrazide resorcinol diacetic acid-bis-hydrazide and the like. It is of course to be understood that the hydrazide containing compounds may be used either alone or in mixtures.

When the reaction is conducted in the melt the reaction mixture rapidly increases in viscosity. The viscosity of solutions of the reactants in one of the polar solvents mentioned above also increases depending upon the amount of solvent used. However, in either instance the solid contents of the reaction mass can be adjusted to form about 20 to about 50 percent by either diluting or thicknening the solution. The viscosity of the solutions should be from about 10 to about 1,000 poises at 20° C.

Color pigments or fillers, for example, titanium dioxide or talcum, kaolin, age resistors and ultraviolet absorbers can be incorporated into the solutions before the shaping, as can also spirit-soluble or fat soluble dyestuffs.

The polymers which can be formed from the solution can be employed for coatings on any desired supports, more especially on textiles. The coating with a storage "one pot solution" free from NCO-groups can be effected in various ways, for example by application with a doctor blade, by means of rollers, by dipping, impregnating, pouring or spraying. In order to evaporate the solvent, the coated support is brought to high temperature, about 60 to 150° C., more especially 80 to 130° C. for a short time. The coated or impregnated dried web can then be reeled, possibly after passing between cooling cylinders. The products of the process are more especially suitable for the manufacture of water proof clothing, all types of tarpaulins and as packing material.

By using, in the production of the polymers, those solvents which can be emulsified with water or by dissolving the polymer subsequently in such a solvent, the elastic material can also be used as an emulsion. With the elastomer solution or with the said emulsion, it is possible after suitable dilution also to treat three-dimensional, irregular fiber fleeces of wool, cotton, staple rayon or other natural or synthetic fibers by dipping, saturating, spraying or impregnating and in this way to obtain unwoven textile sheet formations. Furthermore, it is possible with the elastomer solutions or emulsions prepared according to the invention to apply final coats to synthetic plastics, more especially to softened polyvinyl chloride foils, or also to line for example metallic containers. In addition, stockings made for example from polyamides can be given a ladder-proof finish and nets or net yarns can be coated to give high-knot strength.

Elastomeric filaments can also be spun from the elastomer solutions by dry-spinning or wet-spinning processes. The spinning is effected from spinning nozzles into a spinning shaft through which hot air is flowing or by spinning the solution into a suitable precipitation bath.

The elastomer solutions obtained according to the invention can be stored and are distinguished from known polyurethane solutions used for coating purposes by the fact that they do not have to be used for further processing immediately after they have been produced, i.e. necessarily at their place of manufacture.

By comparison with other elastomer solutions, these can be highly pigmented, 50 to 100% based on the plastic content of the solution, and yield coatings with a good handle, good resistance to weather, good stability with respect to alkalis and solvents (such as benzine and trichloroethylene or perchloroethylene) and have high tensile strength and resistance to further tearing. They are also distinguished from others by exceptional resistance to abrasion.

The invention is further illustrated but not limited by the following examples, in which parts are by weight unless otherwise specified.

*Example 1*

About 150 parts of a polyester of ethylene glycol and adipic acid having an hydroxyl number of 56 are dehydrated for about 1 hour at about 130° C. in vacuo and heated with about 41.6 parts of diphenyl dimethyl methane-4,4'-diisocyanate for 60 minutes at about 110° C. After cooling the melt to about 75° C., about 0.70 part of butane-1,4-diol is added and the melt is thereafter taken-up in about 90 parts of dry chlorobenzene at a temperature of about 80° C. The solution is kept for about 15 minutes from at about 75 to about 80° C. and then cooled to about 20° C. The solution has an NCO-number of 2.24. After dilution with about 180 parts of dimethyl formamide, an NCO-number of 1.05 is found.

A solution of about 3.42 parts of carbodihydrazide in about 200 parts of dimethyl formamide at about 70° C. is prepared and introduced dropwise while stirring from about 0 to about 5° C. into about 307 parts of the said solution. In order to avoid a swelling of the polymer, the addition reaction is stopped by adding about 1.0 parts of hydrazomonocarboxylic acid ethyl ester in about 15 parts of dimethyl formamide. The excess stopping agent is transformed by adding about 1.5 parts by volume of pyrocarbonic acid diethyl ester in about 5 parts of diethyl formamide into hydrazodicarboxylic acid diethyl ester. The 24.7% solution is concentrated to 39% by distilling off solvents in vacuo. The viscosity is then 480 poises at 20° C.

About 500 parts of this solution are ground with about 160 parts of kaolin, about 20 parts of titanium dioxide and about 20 parts of an organic pigment dyestuff on a one-cylinder color mill and applied with a doctor blade to a web of cotton fabric. In order to evaporate the solvents, the coated web is conducted through a drying cabinet at a temperature of about 80° C. In order to judge the storability of the solution, this is applied once again after being stored for about 8 weeks at about 30° C.; the same textile properties are observed. Using an eccentric disc provided with fine emery paper and running under a load of about 200 g., the abrasion after 500 revolutions is 7.5 mg. A coating prepared according to Example 1 of the German Patent 1,112,041, likewise by a one-component method, has on the other hand an abrasion of 25 to 35 mg. The breaking factor under bending is 100,000 at 20° C. and 50,000 to 65,000 at −20° C. Resistance to weather and tropical influences is good and the light fastness is very good. The unpigmented film has the following properties:

| | |
|---|---|
| Thickness, mm. | 0.08 |
| Tensile strength, kg./cm.² | 385 |
| Elongation, percent | 700 |
| Modulus 20% elongation, kg./cm.² | 14.0 |
| Modulus 300% elongation, kg./cm.² | 50 |
| Resistance to further tearing according to Graves, kg./cm. | 24 |
| Microhardness | 52 |

*Example 2*

About 65.0 parts of a polyester obtained from diethylene glycol and adipic acid and having an hydroxyl OH-number of 43.2 and about 50 parts of a polyester obtained from ethylene glycol and adipic acid and having an hydroxyl OH-number of 56 are dehydrated for about 1 hour in vacuo at about 130° C. and heated with about 17.8 parts of toluylene diisocyanate (70/30 isomer mixture) for about 50 minutes at about 110° C. The melt is dissolved in about 80 parts of chlorobenzene, about 0.99 part of phenylene-1,4-bishydroxyethyl ether is added and the solution is heated for about 25 minutes at about 80° C. After cooling to about 20° C. the solution is diluted with about 330 parts of dimethyl formamide. The NCO-content of the solution is 0.62%.

A solution of about 2.68 parts of hexane-bis-semicarbazide and about 3.65 parts of succinic acid dihydrazide in about 20 parts of water is added dropwise to about 500 parts of the aforementioned solution while mixing well and at about 5 to about 10° C. A viscous solution is formed, which has a viscosity of about 260 poises at about 20° C. after being concentrated to 35% solid content.

Pigment and filler are added to the solution in the manner described in Example 1 and the solution is then applied by means of a doctor blade to a cotton fabric. The abrasion after 500 revolutions is 4.7 mg.

*Example 3*

About 250 parts of a polyester obtained from diethylene glycol and adipic acid having an hydroxyl number of 43.2 are dehydrated for about 1 hour in vacuo at about 130° C. and heated in admixture with about 6.9 parts of octadecane-1,12-diol with about 40.6 parts of hexamethylene-1,6-diisocyanate for about one hour at about 110° C. The hot melt is dissolved in about 150 parts of chlorobenzene, about 3.20 parts of diethylene glycol in about 4 parts of chlorobenzene are added and the reaction solution is kept for about 25 minutes at about 110° C. After cooling to about 30° C., the solution is diluted with about 500 parts of dimethyl formamide, NCO-number 0.65.

Another 380 parts of dimethyl formamide are added to about 764 parts of this solution. At about 0 to about 10° C., a solution of about 4.28 parts of carbodihydrazide in about 20 parts of water is added. The solution concentrated to a solid content of 36% has a viscosity of about 170 poises at about 20° C.

A coating prepared after addition of pigment and fillers is extremely fast to light and shows good resistance to weather influences and a soft textile handle.

*Example 4*

About 100 parts of a polyester obtained from about 50 mol percent ethylene glycol, about 50 mol percent propylene-1,2-glycol and adipic acid, and having an hydroxyl number of 53.2 and an acid number of 2.0 are dehydrated for about 1 hour at about 130° C. in vacuo and thereafter heated with about 20.1 parts of diphenyl methane-4,4-diisocyanate for about 60 minutes at about 100° C. The hot melt is dissolved in about 120 parts of chlorobenzene, a solution of about 0.45 part of butane-1,4-diol in about 2 parts of absolute dioxane is added and the mixture heated for about another 60 minutes at about 110° C. The NCO-content is then 0.805%. The solution is then diluted at about 20° C. with about 400 parts of dimethyl formamide and then the NCO-content is 0.282%.

A solution of about 2.64 parts of ω-amino-caproic acid hydrazide in about 100 parts of dimethyl formamide at a temperature of about 70° C. is then run-into about 550 parts of the said solution while mixing well. A viscous solution is formed, which is concentrated to about 25% solid content before incorporating color pigment and fillers by rolling.

Pigment and filler are added to the solution in the manner described in Example 1 and the solution is applied by means of a doctor blade to a cotton fabric. Soft, abrasion-resistant coatings are obtained.

*Example 5*

About 100 parts of the polyester described in Example 4 are dehydrated for about 1 hour at about 130° C. in vacuo and heated with about 25.1 parts of diphenyl methane-4,4′-diisocyanate for about 60 minutes at about 100° C. The hot melt is dissolved in about 120 parts of chlorobenzene, a solution of about 0.45 part of butane-1,4-diol in about 2 parts of absolute dioxane is added and the combined solution heated for about another 60 minutes at about 100° C. The NCO-content of the solution is 1.30%.

A solution of about 4.38 parts of ω-hydroxy butyric acid hydrazide in about 100 parts of absolute dioxane at a temperature of about 85° is added to about 240 parts of this solution at about 20° C. while stirring well. The solution becomes cloudy and distinctly more viscous. The reaction mixture is now heated for about 20 minutes at about 100° C. The viscous, opaque mass (36.5% solid content) has pigment and filler added thereto in the manner described in Example 1 and is applied by means of a doctor blade to a cotton fabric, being freed from the solvents in a heating chamber at about 110° C.

It is of course to be understood that any of the active hydrogen containing polymers set forth throughout the specification and any of the organic polyisocyanates mentioned above may be utilized in place of those more specifically set forth in the working examples in the preparation of the NCO terminated prepolymer. Of course, it also follows that any of the polyhydric alcohols can be used in reaction with the NCO terminated prepolymers to prepare the polyurethane intermediate. Also, any hydrazide containing compound in accordance with the formulas set forth and any of the solvents may be substituted for those particularly set forth in the working examples.

Although the invention has been described in considerable detail for the purpose of illustration, it is to be understood that variations can be made by those skilled in the art without departing from the spirit of the invention and scope of the claims.

What is claimed is:

1. A process for the preparation of polyurethane polymers which comprises reacting
   (1) a substantially linear NCO terminated polyurethane prepolymer prepared by reacting
      (a) an organic compound having a molecular weight of from about 500 to about 5000 and containing active hydrogen atoms which are reactive with —NCO groups and selected from the group consisting of hydroxy polyesters, polyester amides, polyalkylene ethers, polythioethers, polyacetals, and hydroxy-terminated polycarbonates, with
      (b) an excess of an organic diisocyanate with
   (2) from about 10 to about 90 equivalent percent of a polyhydric alcohol to form a polyurethane intermediate and reacting said polyurethane intermediate with
   (3) from about 90 to about 110 equivalent percent based on the remaining NCO content of said intermediate with a hydrazide having a formula selected from the group consisting of R—NH—NR—A—(XA)$_n$—NR—NHR
   RNH—Z—A—NR—NHR
   HO—Z—A—NR—NHR wherein A is selected from the group consisting of CO, CS and SO$_2$; R is selected from the group consisting of hydrogen, aryl and alkyl; X is selected from the group consisting of alkylene, arylene, aralkylene, OYO and HN—Y—NH where Y is a divalent organic radical; Z is selected from the group consisting of alkylene, arylene, aralkylene, YO and YNH and $n$ is a number from 0 to 1.

2. The process of claim 1 wherein the reactions are conducted in a suitable mixture solvent for the reactants and the product.

3. The process of claim 1 wherein only the reaction of the polyurethane intermediate with the hydrazide containing compound is conducted in a suitable inert polar solvent for the reactants and the product.

4. The process of claim 1 wherein the final reaction product is dissolved in a suitable polar, inert solvent.

5. The process of claim 1 wherein the hydrazide containing compound is carbodihydrazide.

6. The process of claim 1 wherein the hydrazide containing compound is adipic acid-bis-hydrazide.

7. The process of claim 1 wherein the hydrazide containing compound is resorcinol diacetic acid-bis-hydrazide.

8. The process of claim 1 wherein the polyhydric alcohol is 1.4-butane diol.

9. The process of claim 1 wherein the polyhydric alcohol is phenylen-1.4-bis-hydroxyl-ethyl-ether.

10. The product prepared by the process of claim 1.

References Cited by the Examiner

UNITED STATES PATENTS 3,016,364   1/1962   Muller _____ 260—856

FOREIGN PATENTS 1,112,409   11/1955   France.
1,105,157   4/1961   Germany.
1,123,467   3/1962   Germany.

MURRAY TILLMAN, *Primary Examiner.*

P. LIEBERMAN, *Assistant Examiner.*